United States Patent
Saha et al.

(10) Patent No.: US 11,601,890 B2
(45) Date of Patent: Mar. 7, 2023

(54) FLEXIBLE UPLINK POWER CONTROL FOR AERIAL USER EQUIPMENTS

(71) Applicant: QUALCOMM Incorporated, San Diego, CA (US)

(72) Inventors: Chiranjib Saha, Blacksburg, VA (US); Alberto Rico Alvarino, San Diego, CA (US); Le Liu, Fremont, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/369,722

(22) Filed: Jul. 7, 2021

(65) Prior Publication Data

US 2023/0011479 A1 Jan. 12, 2023

(51) Int. Cl.
*H04W 52/10* (2009.01)
*H04W 52/14* (2009.01)
*H04W 72/1268* (2023.01)
*H04L 5/00* (2006.01)
*H04W 72/04* (2023.01)

(52) U.S. Cl.
CPC ......... *H04W 52/146* (2013.01); *H04L 5/0051* (2013.01); *H04W 52/10* (2013.01); *H04W 72/048* (2013.01); *H04W 72/1268* (2013.01)

(58) Field of Classification Search
CPC . H04W 52/146; H04W 52/10; H04W 72/048; H04W 72/1268; H04L 5/0051
USPC ........................................................ 455/522
See application file for complete search history.

(56) References Cited

U.S. PATENT DOCUMENTS

| | | | |
|---|---|---|---|
| 10,506,523 B2 * | 12/2019 | Zhang | H04W 52/146 |
| 10,993,252 B2 * | 4/2021 | John Wilson | H04W 74/004 |
| 11,336,488 B2 * | 5/2022 | Park | H04B 7/0639 |
| 2018/0146433 A1 * | 5/2018 | Zhang | H04W 52/146 |
| 2018/0288749 A1 * | 10/2018 | Sun | H04W 72/042 |
| 2019/0028252 A1 * | 1/2019 | Akkarakaran | H04L 5/0053 |
| 2019/0166565 A1 * | 5/2019 | Gaal | H04L 5/001 |
| 2019/0190747 A1 * | 6/2019 | Park | H04W 80/02 |
| 2019/0199554 A1 * | 6/2019 | Park | H04W 52/242 |
| 2019/0372806 A1 * | 12/2019 | Park | H04L 5/0057 |
| 2020/0007375 A1 * | 1/2020 | Zhang | H04L 25/0226 |
| 2020/0169990 A1 * | 5/2020 | Takeda | H04W 52/146 |
| 2020/0245372 A1 * | 7/2020 | Lei | H04L 5/0023 |
| 2020/0287753 A1 * | 9/2020 | Park | H04W 52/32 |
| 2020/0314760 A1 * | 10/2020 | Ye | H04W 52/10 |
| 2020/0383060 A1 * | 12/2020 | Park | H04W 52/42 |
| 2021/0084597 A1 * | 3/2021 | Han | H04W 80/02 |
| 2021/0160784 A1 * | 5/2021 | Yang | H04W 52/146 |
| 2021/0203377 A1 * | 7/2021 | Akkarakaran | H04W 52/247 |
| 2021/0282143 A1 * | 9/2021 | Lee | H04W 52/281 |
| 2021/0297956 A1 * | 9/2021 | Park | H04W 24/08 |
| 2021/0377870 A1 * | 12/2021 | Yang | H04W 52/10 |
| 2022/0053428 A1 * | 2/2022 | Hwang | H04W 52/42 |
| 2022/0078758 A1 * | 3/2022 | Lee | H04L 5/0053 |

* cited by examiner

*Primary Examiner* — Hai V Nguyen
(74) *Attorney, Agent, or Firm* — Patterson + Sheridan, L.L.P.

(57) ABSTRACT

Aspects of the present disclosure relate to wireless communications, and more particularly, to techniques for managing uplink power control. For example, the techniques may be used for uplink power control for physical uplink shared channel (PUSCH) transmissions from unmanned aerial vehicles (UAVs).

22 Claims, 20 Drawing Sheets

| p0alphaList | SetupRelease { p0alphaList } |

*p0alphaList* in *SRS-ResourceSet* as follows:

```
p0alphaList ::= SEQUENCE (SIZE (1..maxNrofp0alpha)) OF
p0alpha

P0alpha ::= SEQUENCE {
P0                 INTEGER (-202..24)
alpha              Alpha
}
```

TRANSMIT, TO A USER EQUIPMENT (UE), A DOWNLINK CONTROL INFORMATION (DCI) SCHEDULING A PHYSICAL UPLINK SHARED CHANNEL (PUSCH) TRANSMISSION, WHEREIN THE DCI INDICATES A SET OF OPEN LOOP POWER CONTROL (OLPC) PARAMETERS, FROM A LIST OF DIFFERENT SETS OF OLPC PARAMETERS EACH SET INCLUDING AT LEAST AN ALPHA PARAMETER FOR FRACTIONAL POWER CONTROL AND A P0 PARAMETER REPRESENTING A TARGET RECEIVED POWER PER RESOURCE BLOCK (RB) AT THE NETWORK ENTITY, WHEN THE DCI LACKS A SOUNDING REFERENCE SIGNAL (SRS) RESOURCE INDICATOR (SRI) FIELD OR IF THE UE HAS NOT BEEN CONFIGURED FOR SRI BASED PUSCH POWER CONTROL

1504

RECEIVE THE PUSCH FROM THE UE.

FIG. 15

FLEXIBLE UPLINK POWER CONTROL FOR AERIAL USER EQUIPMENTS

BACKGROUND

Field of the Disclosure

Aspects of the present disclosure relate to wireless communications, and more particularly, to techniques for managing uplink power control for aerial user equipments (UEs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a BS, 5G NB, next generation NodeB (gNB or gNodeB), TRP, etc.). A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a DL and on an UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and desirable techniques for managing uplink power control in accordance with priority-specific beta factors.

Certain aspects provide a method of wireless communications by a user equipment (UE). The method generally includes receiving, from a network entity, a medium access control (MAC) control element (CE); receiving, from the network entity, a downlink control information (DCI) scheduling a physical uplink shared channel (PUSCH) transmission; selecting a set of open loop power control (OLPC) parameters based on information in the MAC CE and the DCI; and transmitting the PUSCH to the network entity, with transmit power determined based on the selected OLPC parameters.

Certain aspects provide a method of wireless communications by a network entity. The method generally includes transmitting, to a user equipment (UE), a medium access control (MAC) control element (CE); transmitting, to the UE, a downlink control information (DCI) scheduling a physical uplink shared channel (PUSCH) transmission, wherein the network entity indicates, a set of open loop power control (OLPC) parameters for the UE for the PUSCH transmission via on information in the MAC CE and the DCI; and receiving the PUSCH from the UE.

Certain aspects provide a method of wireless communications by a user equipment (UE). The method generally includes receiving, from a network entity, a downlink control information (DCI) scheduling a physical uplink shared channel (PUSCH) transmission; selecting a set of open loop power control (OLPC) parameters, from a list of different sets of OLPC parameters, based on information in the DCI when the DCI lacks a sounding reference signal (SRS) resource indicator (SRI) field or if the UE has not been configured for SRI based PUSCH power control; and transmitting the PUSCH to the network entity, with transmit power determined based on the selected OLPC parameters.

Certain aspects provide a method of wireless communications by a network entity. The method generally includes transmitting, to a user equipment (UE), a downlink control information (DCI) scheduling a physical uplink shared channel (PUSCH) transmission, wherein information in the DCI indicates a set of open loop power control (OLPC) parameters for the UE for the PUSCH transmission when the DCI lacks a sounding reference signal (SRS) resource indicator (SRI) field or if the UE has not been configured for SRI based PUSCH power control; and receiving the PUSCH from the UE.

Certain aspects also provide various apparatus and means capable of performing the operations described above and/or computer readable mediums with instructions stored thereon performing the operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 8 illustrates an example configuration for uplink transmission power control, in accordance with certain aspects of the present disclosure.

FIG. 15 illustrates example operations for wireless communication by a network entity, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
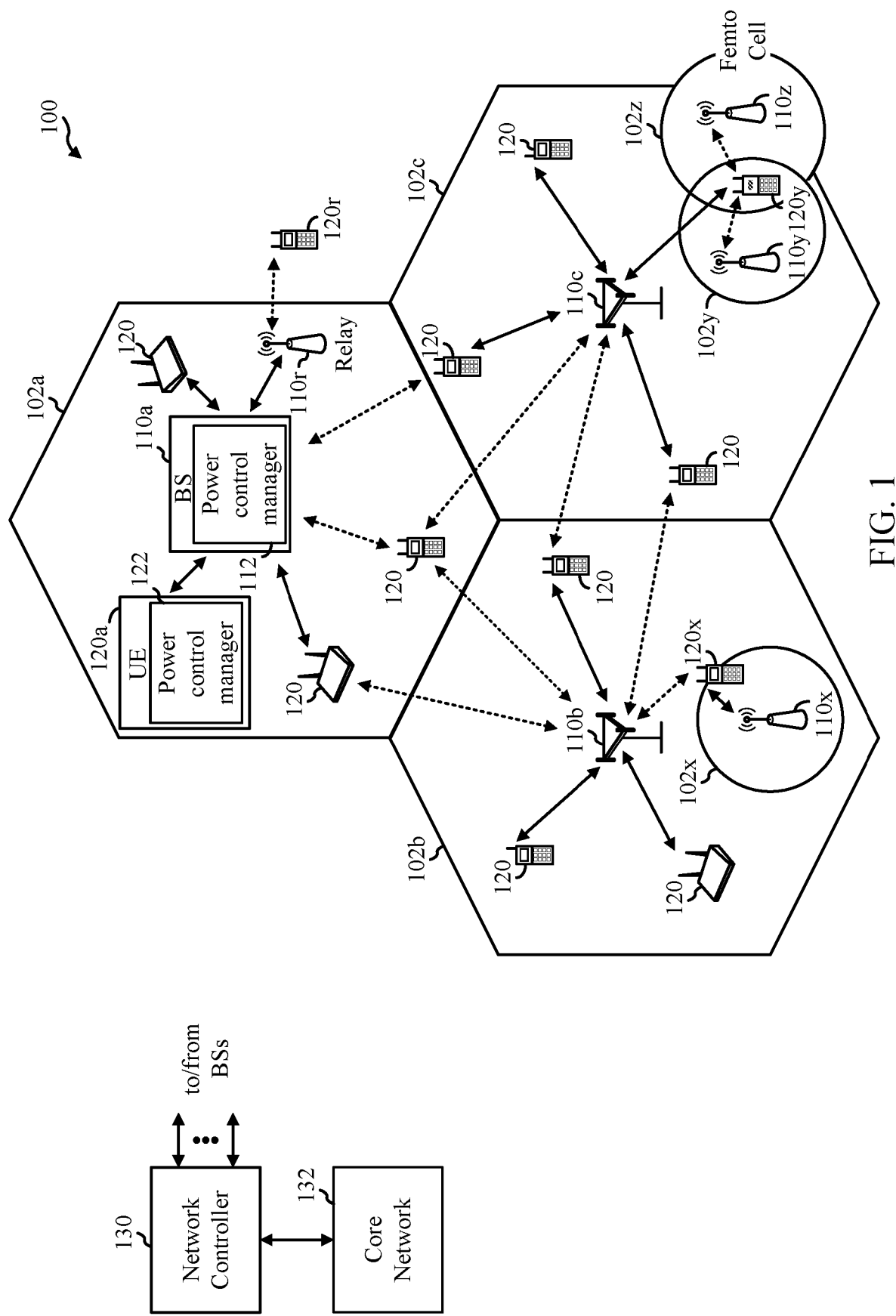
FIG. 1 is a block diagram conceptually illustrating an example wireless communication network, in accordance with certain aspects of the present disclosure.

Aspects of the present disclosure provide apparatuses, methods, processing systems, and computer readable mediums for flexible uplink transmission power control, for example, for aerial user equipments (UEs). Dynamic signaling may be used to update open loop power control (OLPC) parameters. For example, in some cases, a medium access control (MAC) control element (CE) may activate a set of OLPC parameters used by a UE (e.g., an alpha and P0 pair) and/or may update a mapping of a sounding reference signal (SRS) resource set indicator (SRI) to OLPC parameters. In other cases, dynamic control information (DCI) may indicate a particular set of OLPC parameters to use.

The following description provides examples of updating OLPC parameters in accordance with aspects of the present disclosure. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with $3^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120 configured for managing uplink power control in accordance with aspects of the present disclosure. As shown in FIG. 1, a UE 120a includes a power control manager 122 configured to perform operations 500 of FIG. 5 and/or operations 1400 of FIG. 14. Similarly, a BS 110 may include a power control manager 112 configured to perform operations 600 of FIG. 6 and/or operations 1500 of FIG. 15.

The wireless communication network 100 may be a new radio (NR) system (e.g., a $5^{th}$ generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
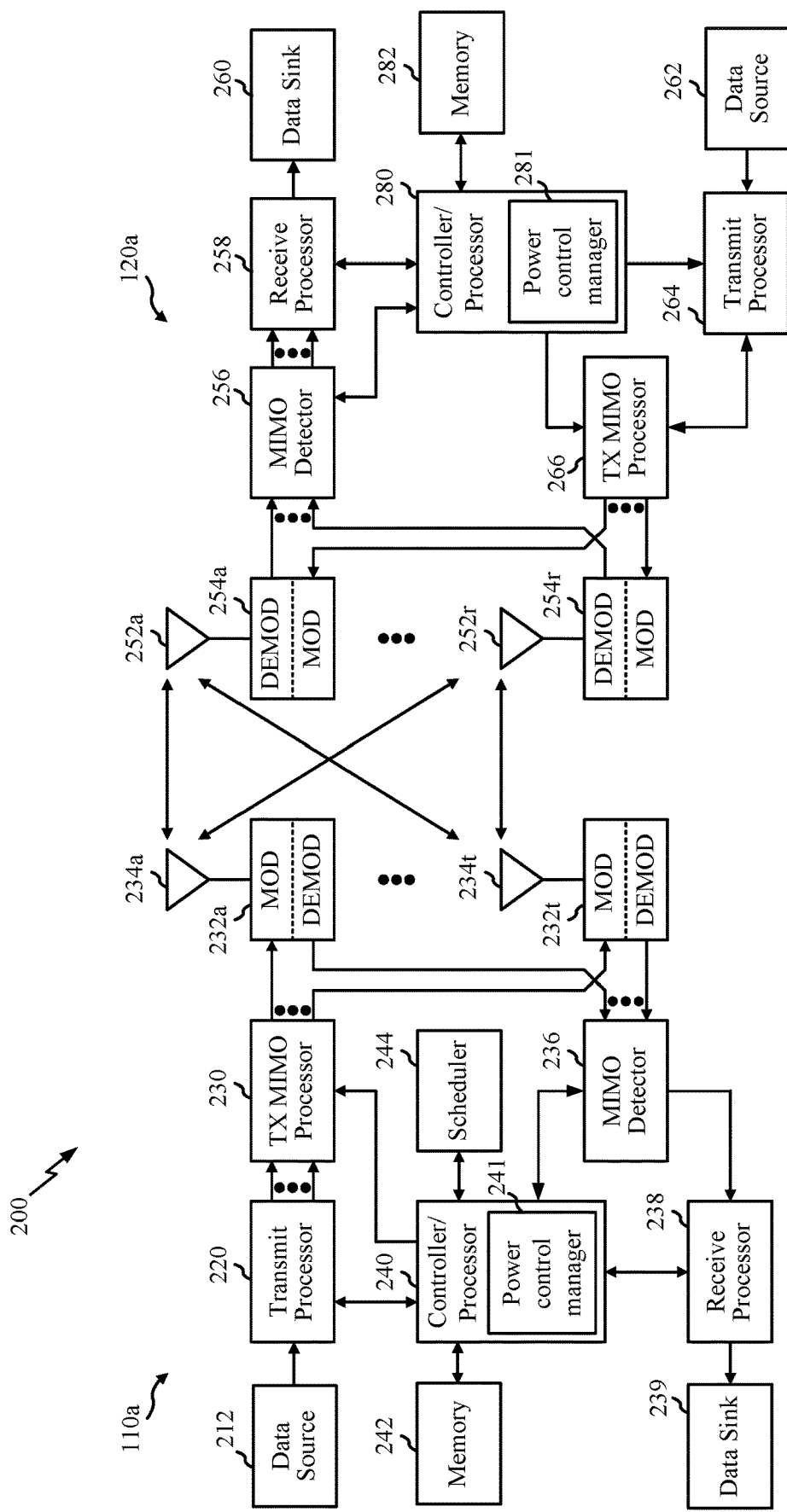
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a power control manager 241 that may be configured to perform 600 of FIG. 6 and/or operations 1500 of FIG. 15. Similarly, the controller/processor 280 of the UE 120a has a power control manager 281 that may be configured to perform operations 500 of FIG. 5 and/or operations 1400 of FIG. 14.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
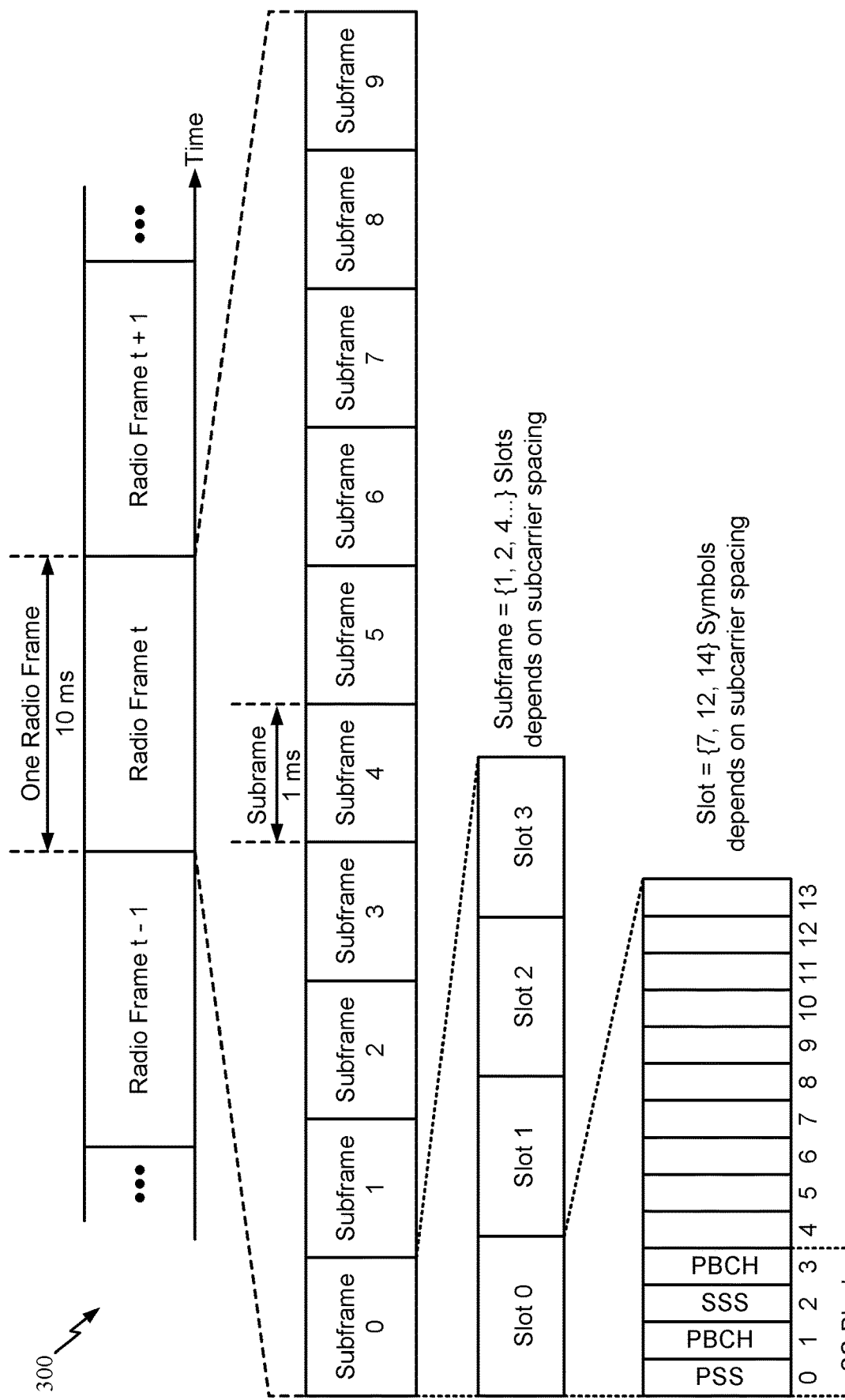
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Flexible Uplink Power Control For Aerial UEs

Power control generally refers to a mechanism for varying transmit power in accordance with varying channel conditions (e.g., to achieve a desired data rate). As the battery of a UE is typically power limited compared to base station power, uplink power control is an important mechanism to limit intra-cell and inter-cell interference and to reduce UE power consumption.

Figure 4:
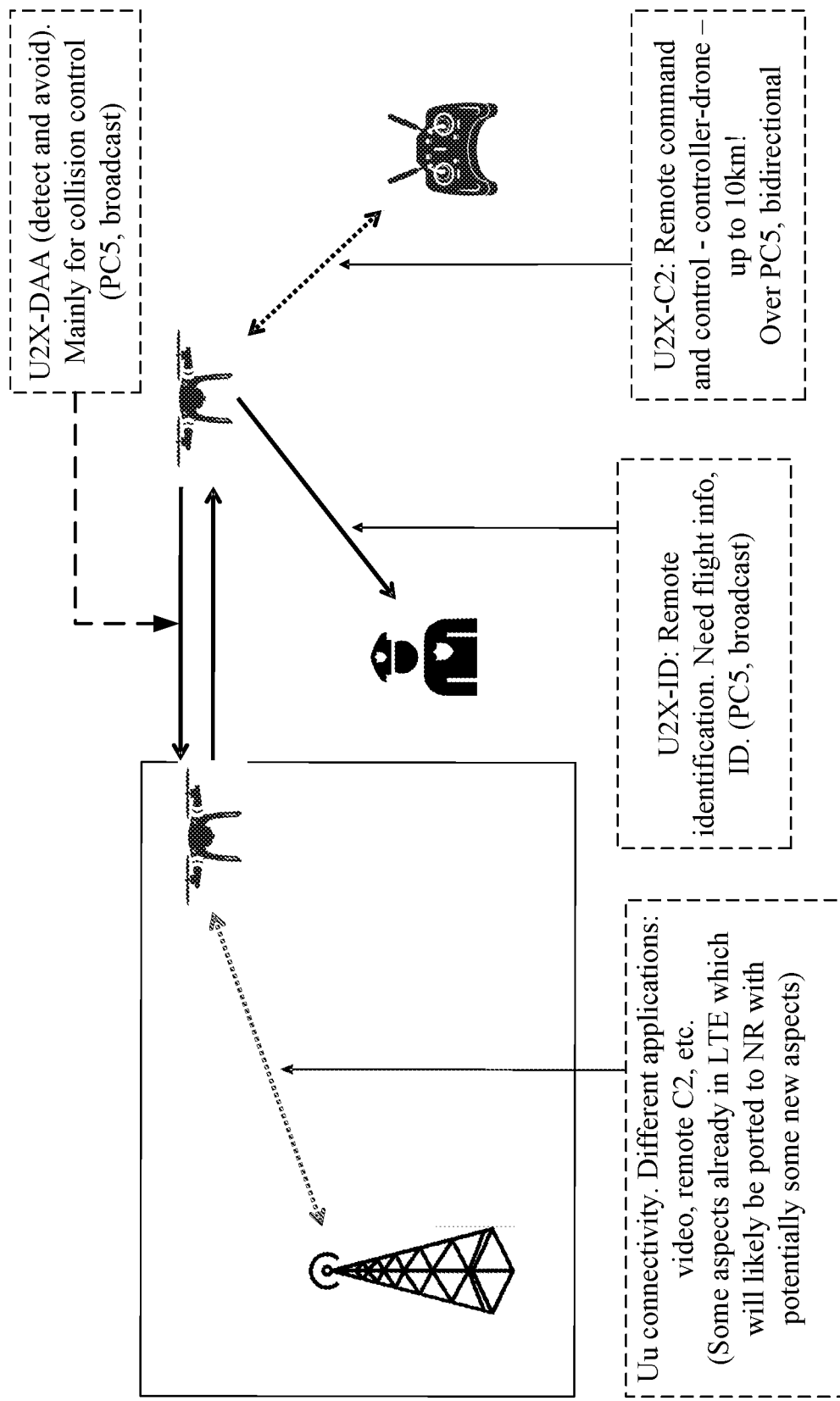
FIG. 4 illustrates various aerial UE scenarios in which aspects of the present disclosure may be practiced.

Aerial UEs, including unmanned aerial vehicles or UAVs (e.g., drones) may have different scenarios with different objectives for uplink transmission power control. For example, as illustrated in FIG. 4, on the cellular (Uu) link, a UAV may support different applications, such as video and remote command and control (C2) applications. A UAV to everything (U2X) application may need identification, for example, with flight information (e.g., via a sidelink/PC5 broadcast). A U2X detect and avoid (DAA) application identification may be used mainly for collision control (e.g., via PC5 broadcast). A U2X-C2 remote command and control (a controller-drone) could reach up to 10 km, with communications over PC5 and possibly bidirectional.

Uplink power control is generally a combination of open loop power control (OLPC) and closed loop power control (CLPC) mechanisms. OLPC generally refers to the ability of a UE transmitter to sets its output power to a specific value to compensate for increases in path loss (PL). CLPC is based on feedback from a base station (BS) to the UE, in the form of a transmit power control command (TPC). Based on the TPC, a UE will either increase or decrease its power as instructed.

For an active UL BWP b of carrier f of serving cell c using a parameter set configuration with index j and PUSCH power control adjustment state with index 1, the UE may determine the PUSCH transmission power on the i-th transmission occasion as:

$$P_{PUSCH,b,f,c}(i, j, q_d, l) = \min\begin{cases} P_{CMAX,f,c}(i), \\ P_{O\_PUSCH,b,f,c}(j) + 10\log_{10}(2^\mu M_{RB,b,f,c}^{PUSCH}(i)) + \alpha_{b,f,c}(i) \cdot PL_{b,f,c}(q_d) + \\ \Delta_{TF,b,f,c}(i) + f_{b,f,c}(i) [\text{dBm}] \end{cases}$$

where $q_d$ is the index of the downlink reference signal (SS/PBCH block or CSI-RS); and: $P_{O\_PUSCH,b,f,c}(j) = P_{O\_NOMINAL\_PUSCH,f,c}(j) + P_{O\_UE\_PUSCH,f,c}(j)$, {j=0, 1, 2, ..., J−1}.

Aspects of the present disclosure provide flexibility in selecting the open loop power control (OLPC) parameters, such as a particular pair of values for $P_0$ and $\alpha$, which may be abbreviated as ($P_0$, $\alpha$). For SRS power control, a UE may determine the SRS transmission power on the i-th transmission occasion as:

$$P_{SRS,b,f,c}(i, j, q_d, l) = \min\begin{cases} P_{CMAX,f,c}(i), \\ P_{O\_SRS,b,f,c}(q_s) + 10\log_{10}(2^\mu M_{SRS,b,f,c}(i)) + \alpha_{SRS,b,f,c}(q_s) \cdot PL_{b,f,c}(q_d) + \\ h_{b,f,c}(i, l) [\text{dBm}] \end{cases}$$

In the equation above for PUSCH power control, $\Delta_{TF,b,f,c}(i)$ generally relates to the modulation and coding scheme (MCS) and generally serves to increase the UE transmit power when transferring a large number of bits per Resource Element. This links the UE transmit power to the Modulation and Coding Scheme (MCS). The number of bits per Resource Element is high when using 64 quadrature amplitude modulation (QAM) and a large transport block size. The number of bits per Resource Element is low when using quadrature phase shift keying (QPSK) and a small transport block size. Increasing the UE transmit power helps to achieve the signal-to-interference-plus-noise ratio (SINR) requirements associated with higher order modulation schemes and high coding rates.

In some cases, a UE may be configured with multiple OPLC parameter sets. For example, the UE may be configured with multiple open-loop-parameter pairs {$P_0$, $\alpha$}. In some cases, this may provide flexibility to choose different {$P_0$, $\alpha$} for different transmission modes, selecting a different parameter set j for different modes. For example, mssg-3 in a random access channel procedure may use a first set (e.g., j=0), a grant free PUSCH transmission may use a second set (e.g., j=1), while a scheduled PUSCH may use a still different set (e.g., j≤1).

For a scheduled PUSCH transmission, there is a possibility of having multiple pairs of open-loop parameters based on an SRS resource-set indicator (SRI). In some cases, uplink power boosting may be allowed via dynamic scheduling, for example, multiple values of $P_0$-s can be configured for uplink preemption (increasing the transmission power to effectively increase the likelihood of that transmission being successfully received even in the presence of interferers). In some cases, a device may be configured up to 3 values of $P_0$, one for normal transmission and others for transmission with increased power. In such cases, a scheduling DCI (the DCI that scheduled the PUSCH) may indicate which of the configured $P_0$ valued to use.

In some cases, different OLPC sets may be used for aerial UEs (AUEs) in LTE and NR. This may be achieved by using UE-specific a values, as this may enable the setting of dedicated (UE-specific) configurations of OLPC parameters.

As described herein, in the case of AUEs, UE-specific power control parameter may allow the network to reconfigure the power control parameter for the UE when the UE is detected to be in flying mode, or when above a configured height threshold.

As will be described below, in some cases, UE-specific OLPC parameters for a scheduled PUSCH transmission may be signaled via an SRS-resource set indicator (SRI). In general, the network may configure multiple SRS resource sets for a given cell and BWP during RRC connection. The UE may be configured, via radio resource control (RRC) signaling with a sequence of ($P_0$, $\alpha$) values/pairs for PUSCH transmission and a mapping from SRI to a particular pair of ($P_0$, $\alpha$) in the sequence. In some cases, the UE may be provided a particular value of SRI in the DCI field to select a particular pair in the sequence of pairs.

Certain aspects of the present disclosure provide techniques for managing uplink (UL) power control (e.g., for SRS and PUSCH transmissions) with the flexible selection of OLPC parameter sets. As will be described in greater detail below, different OLPC parameter sets may be chosen based on MAC CE or DCI signaling. As an example, a first proposal provides flexibility of choosing P0, alpha values for SRS. This can be configured by signaling a p0-alpha-list for an SRS-ResourceSet via RRC and indicating an ID from p0-alpha-list through a MAC CE. A second proposal provides similar flexibility for choosing P0, alpha values for PUSCH via updating mappings signaled via a MAC CE. A third proposal provides flexibility for choosing P0, alpha values for PUSCH via DCI.

Figure 5:
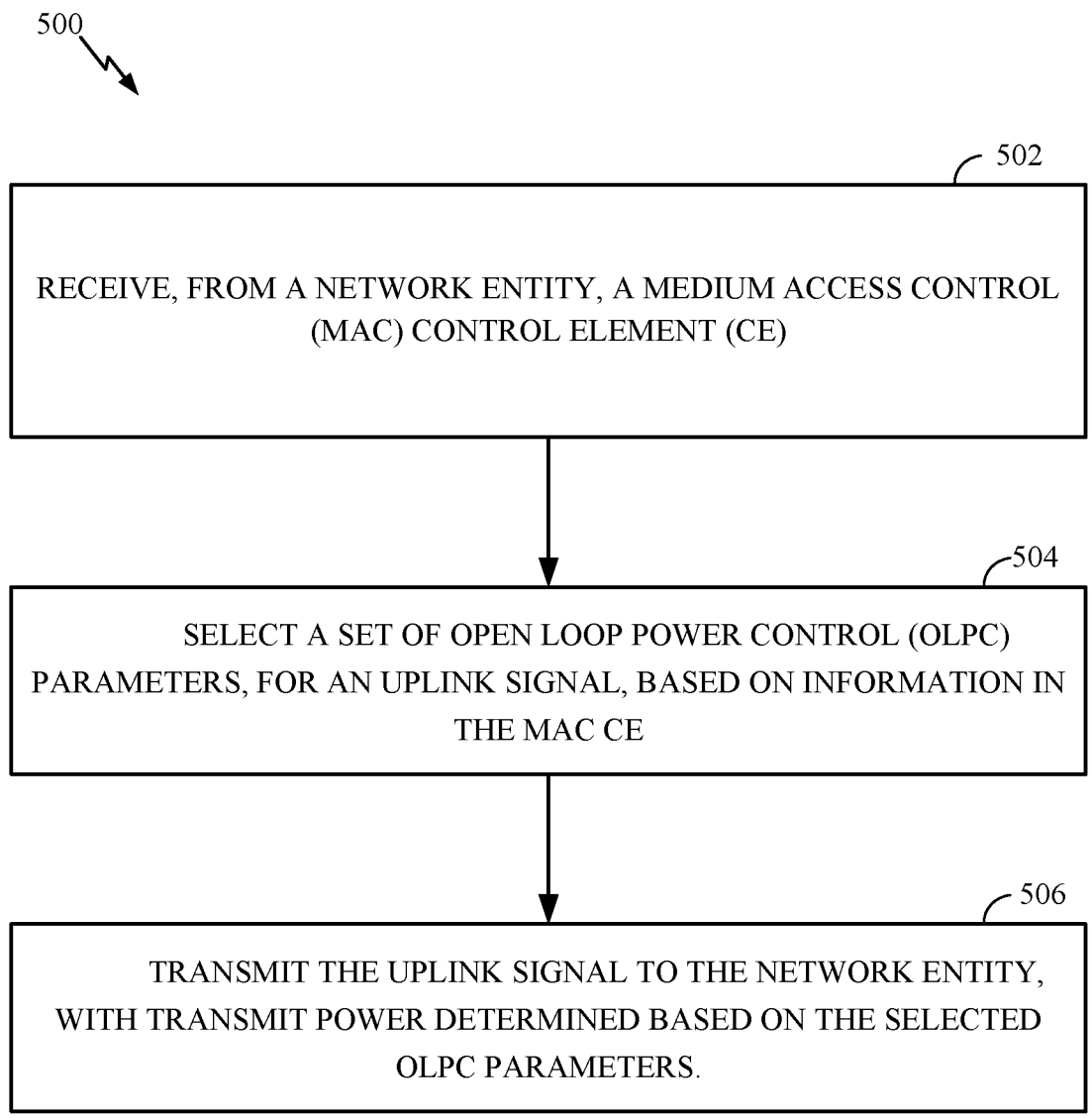
FIG. 5 illustrates example operations for wireless communication by a UE, in accordance with certain aspects of the present disclosure.

FIG. 5 is a flow diagram illustrating example operations 500 for wireless communication by a UE (e.g., to select OLPC parameters according to the first or second proposals described above), in accordance with certain aspects of the present disclosure. The operations 500 may be performed, for example, by the UE 120a in the wireless communication network 100. The operations 500 may be implemented as software components that are executed and run on one or more processors (e.g., the controller/processor 280 of FIG. 2). Further, the transmission and reception of signals by the UE in operations 500 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

Operations 500 begin, at 502, by receiving, from a network entity, a medium access control (MAC) control element (CE). At 504, the UE selects a set of open loop power control (OLPC) parameters for an uplink signal based on information in the MAC CE. For example, the uplink signal may be SRS or a PUSCH. At 506, the UE transmits the uplink signal to the network entity, with transmit power determined based on the selected OLPC parameters.

Figure 6:
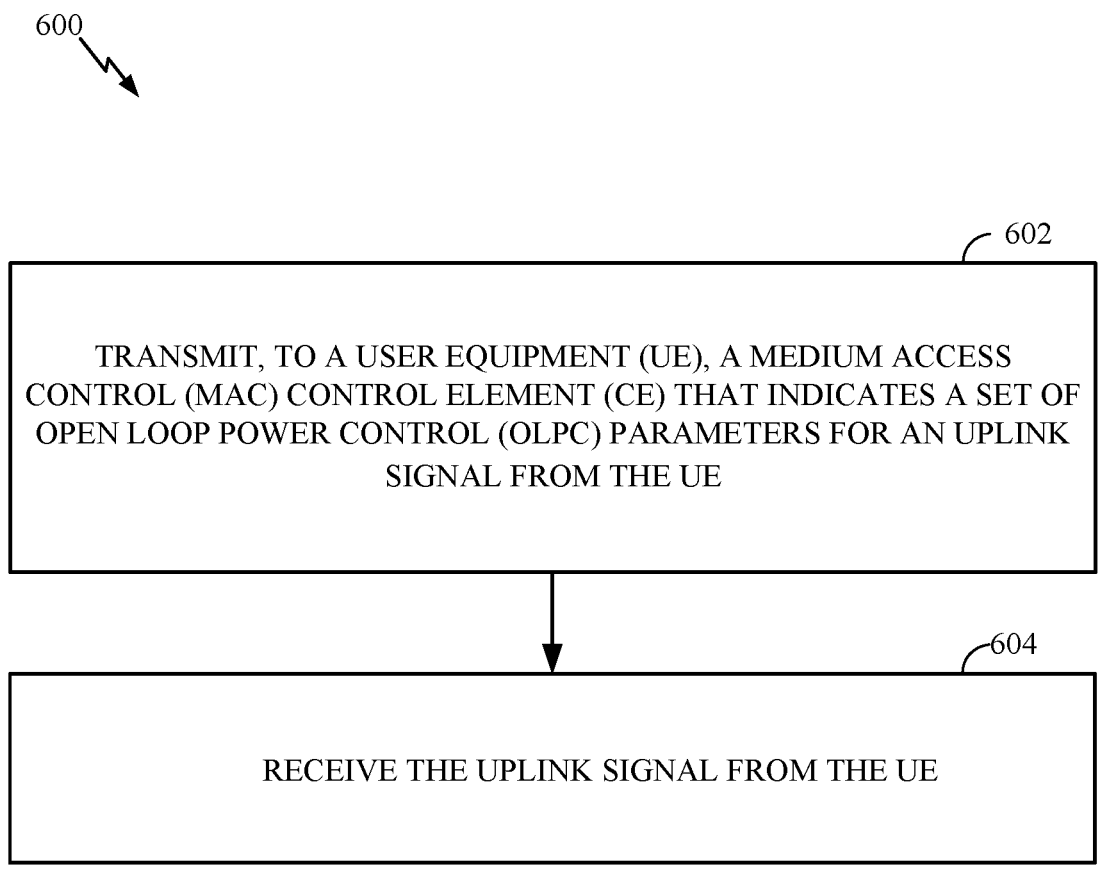
FIG. 6 illustrates example operations for wireless communication by a network entity, in accordance with certain aspects of the present disclosure.

FIG. 6 is a flow diagram illustrating example operations 600 that may be considered complementary to operations 500 of FIG. 5. For example, the operations 600 may be performed by a network entity (e.g., such as the BS 110a in the wireless communication network 100) to signal an OLPC parameter set to a UE performing operations 500 of FIG. 5. The operations 600 may be implemented as software components that are executed and run on one or more processors (e.g., the controller/processor 240 of FIG. 2). Further, the transmission and reception of signals by the BS in operations 600 may be enabled, for example, by one or more antennas (e.g., the antennas 234 of FIG. 2). In certain aspects, the transmission and/or reception of signals by the BS may be implemented via a bus interface of one or more processors (e.g., the controller/processor 240) obtaining and/or outputting signals.

Operations 600 begin, at 602, by transmitting, to a user equipment (UE), a medium access control (MAC) control element (CE) that indicates a set of open loop power control (OLPC) parameters for an uplink signal from the UE. At 604, the network entity receives the uplink signal from the UE.

Figure 7:
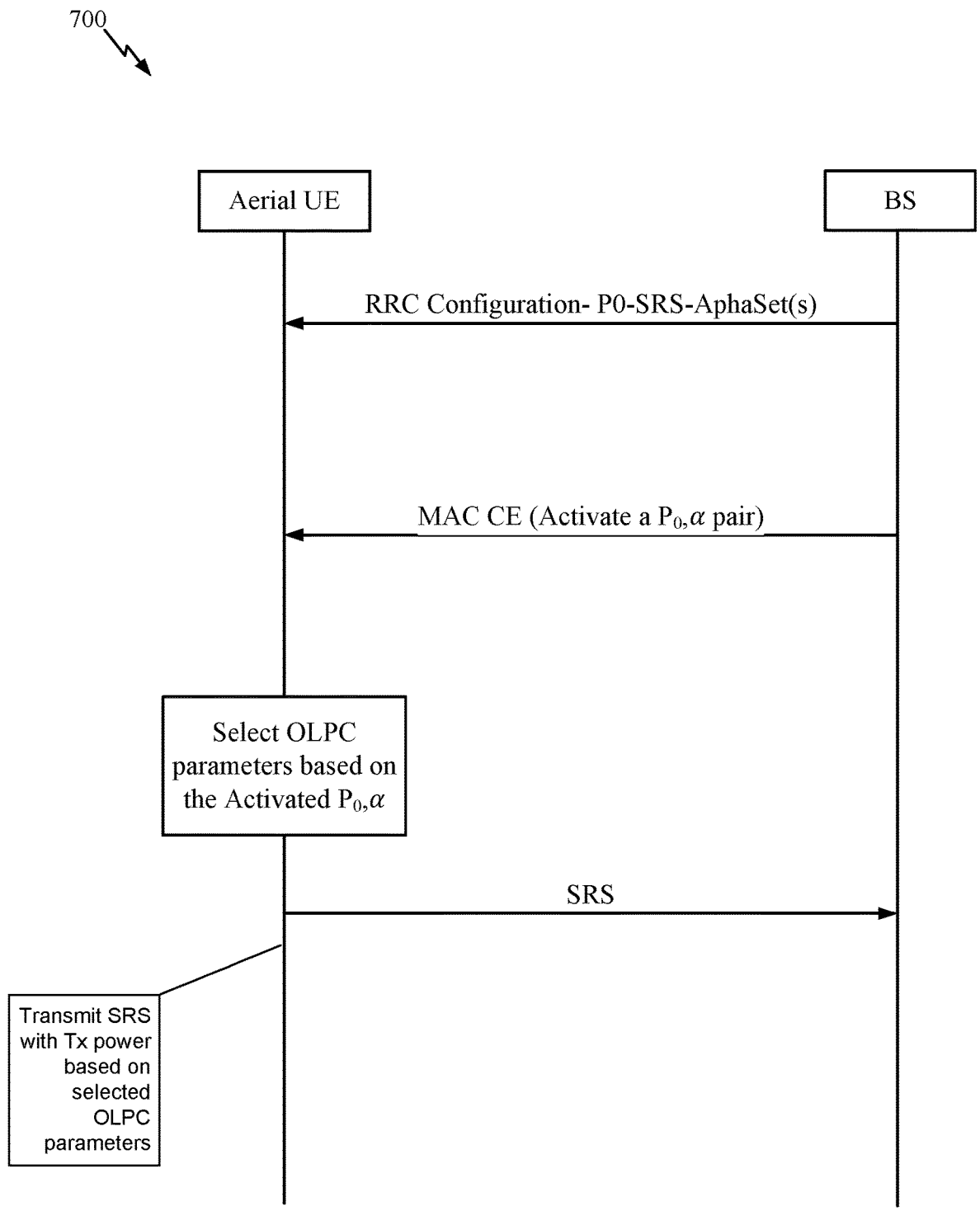
FIG. 7 is a call flow diagram illustrating uplink transmission power control, in accordance with certain aspects of the present disclosure.

Operations 500 and 600 of FIGS. 5 and 6 may be understood with reference to the call flow diagram of FIG. 7 which illustrates flexible power control for SRS resource set (e.g., according to the first proposal described above).

As illustrated, the UE may be configured with a sequence of sequence of ($P_0$, $\alpha$) values/pairs. For example, via an SRS-Config information element, an SRS resource set may have an associated sequence of ($P_0$, $\alpha$) values (which may be referred to as a p0alphaList) as illustrated in FIG. 8.

Referring back to FIG. 7, the network may activate one of the ($P_0$, $\alpha$) values (in the configured p0alphaList) via a MAC CE. The UE may select OLPC parameters based on the $P_0$, $\alpha$ pair (activated by the MAC CE) and transmit SRS based on the selected OLPC parameters.

Figure 9:
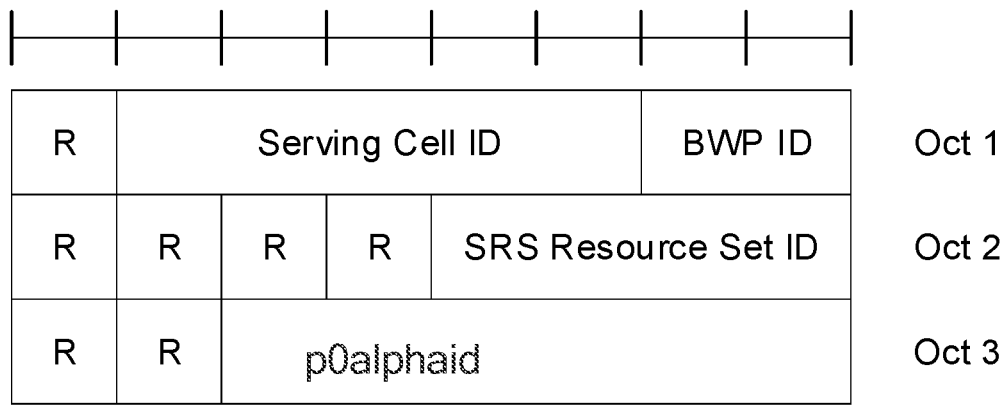
FIG. 9 illustrates an example medium access control (MAC) control element (CE) for uplink transmission power control, in accordance with certain aspects of the present disclosure.

An example of such a MAC CE is shown in FIG. 9. As illustrated, this MAC CE may indicate, via a p0alphaID field, a particular value in a p0alphaList for a given SRS resource set (identified via an SRS Resource Set ID field).

Figure 10:
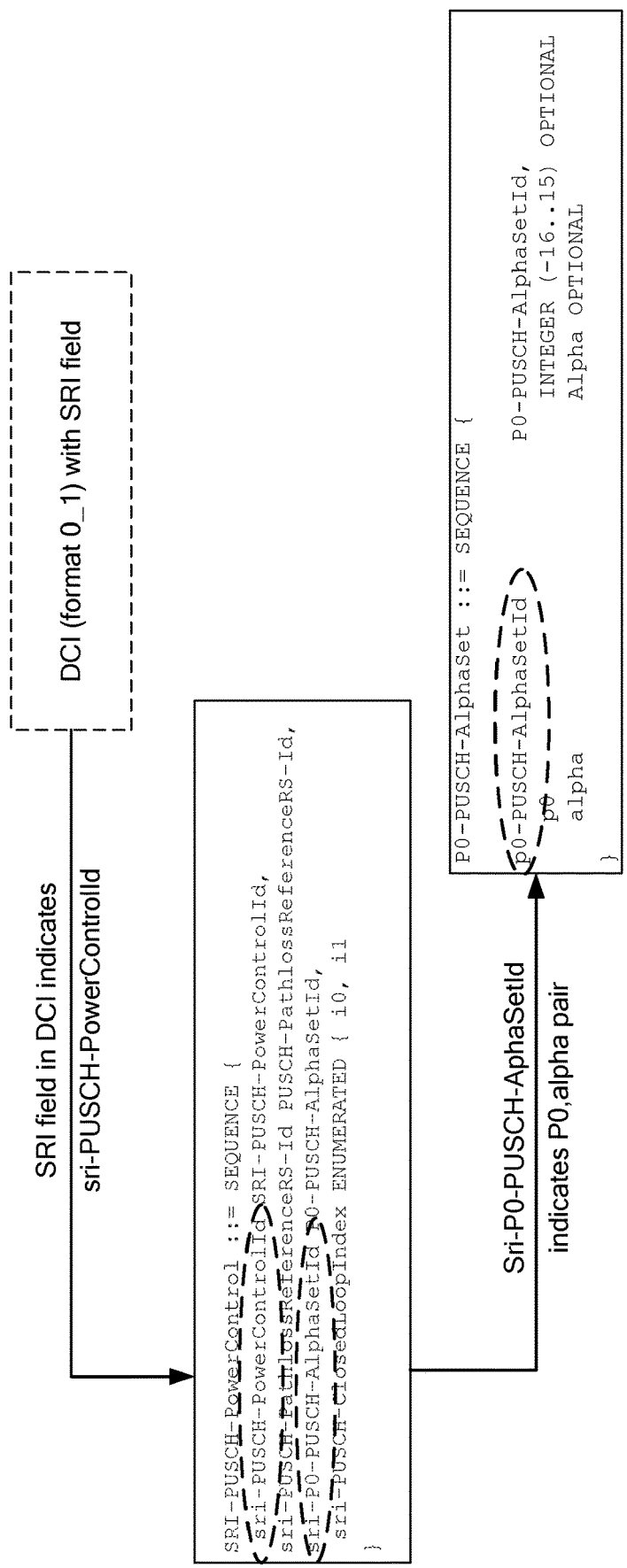
FIG. 10 illustrates an example configuration for uplink transmission power control, in accordance with certain aspects of the present disclosure.

As noted above, a second proposal provides flexibility for choosing P0, alpha values for PUSCH via updating mappings signaled via a MAC CE. As illustrated in FIG. 10, a PUSCH transmission is scheduled with a DCI format having an SRI, the UE obtains a mapping from an sri-PUSCH-PowerControlId in SRI-PUSCH-PowerControl (RRC configured) between a set of values for the SRI field in the DCI format and a set of indexes provided by p0-PUSCH-Alpha-SetId. The set of indexes may map to a set of P0-PUSCH-AlphaSet values and determines the values of ($P_0$, $\alpha$) from the p0-PUSCHAlphaSetId value that is mapped to the SRI field value. Typically, this mapping between an SRI and p0-PUSCHAlphaSetId is fixed and can be updated by RRC (re)configuration only after an RRC connection is established.

Figure 11:
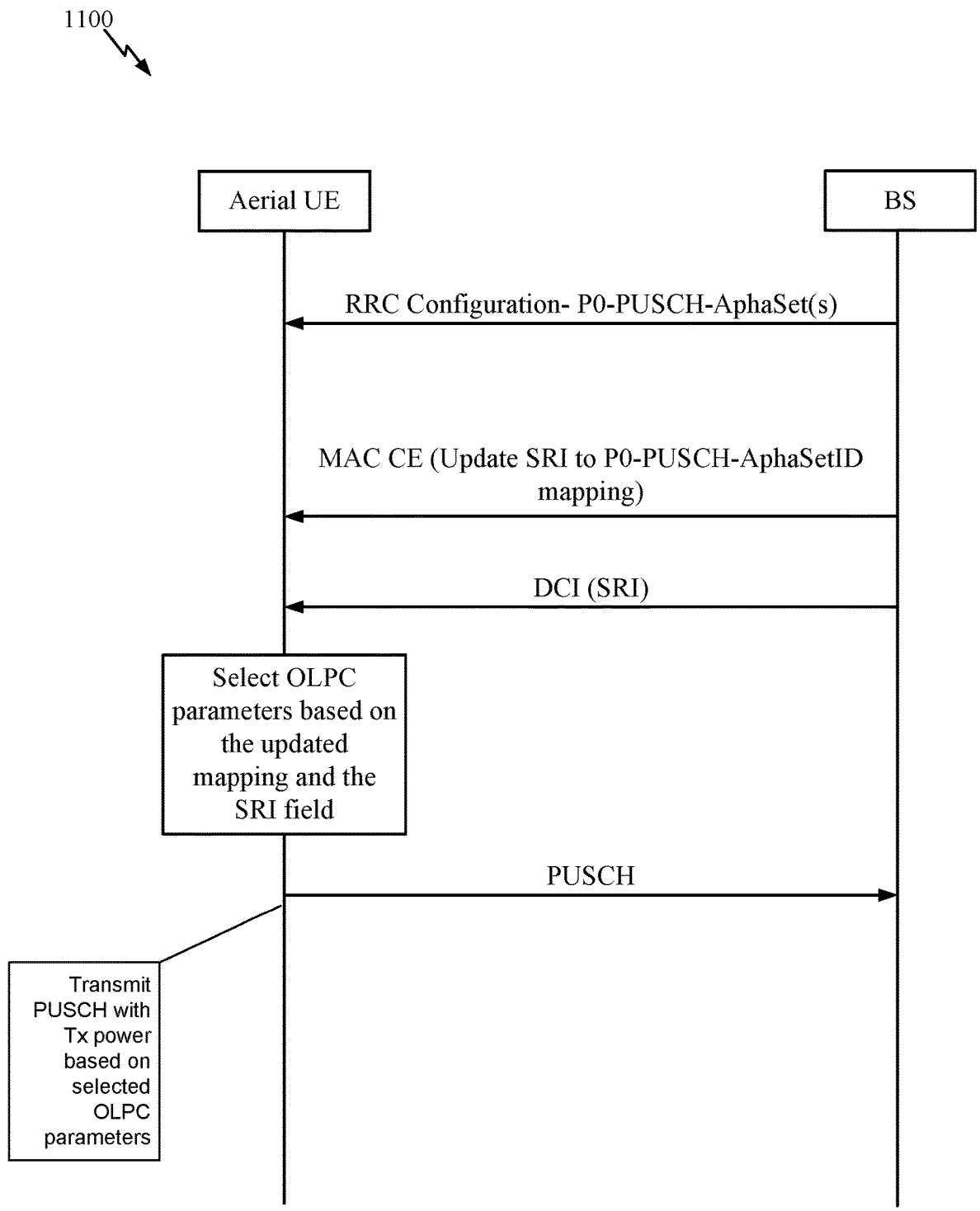
FIG. 11 is a call flow diagram illustrating uplink transmission power control, in accordance with certain aspects of the present disclosure.

Aspects of the present disclosure, however, provide the flexibility to update the mapping between an SRI and p0-PUSCHAlphaSetId, as shown in the call flow diagram of FIG. 11.

As illustrated, the UE may be configured with a sequence of sequence of ($P_0$, $\alpha$) values/pairs (identified via a PUSCHAlphaSetId) and a mapping between an SRI and p0-PUSCHAlphaSetId. As illustrated, however, the network may update the mapping via a MAC CE. When a PUSCH transmission is scheduled via a DCI that contains an SRI (for which the mapping was updated), the UE may select OLPC parameters based on the updated mapping and the SRI.

Figure 12:
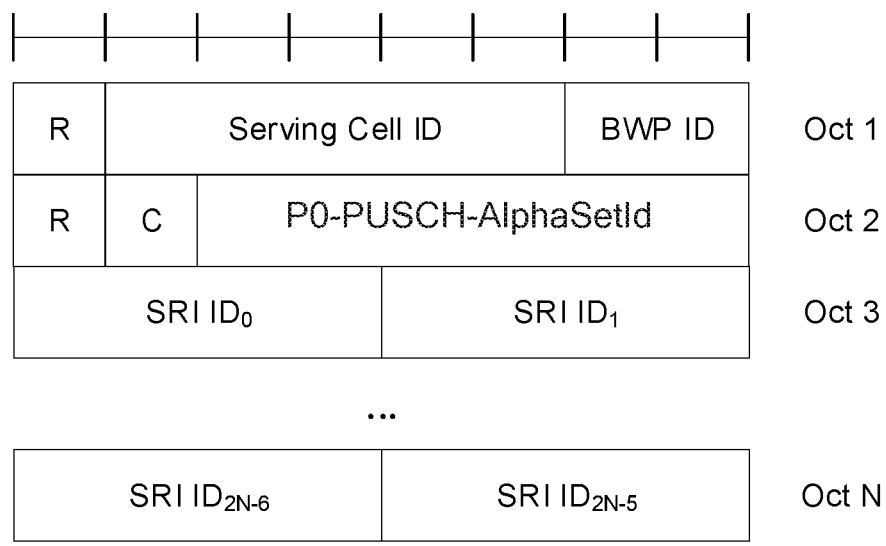
FIG. 12 illustrates an example medium access control (MAC) control element (CE) for uplink transmission power control, in accordance with certain aspects of the present disclosure.

An example of such a MAC CE is shown in FIG. 12. As illustrated, this MAC CE may indicate a p0-PUSCH-alphaSetID and different SRI values may be mapped to different ($P_0$, $\alpha$) pairs in the sequence by listing the different SRI IDs in subsequent fields (e.g., the first listed SRI ID may be mapped to the first pair in the sequence).

Figure 13:
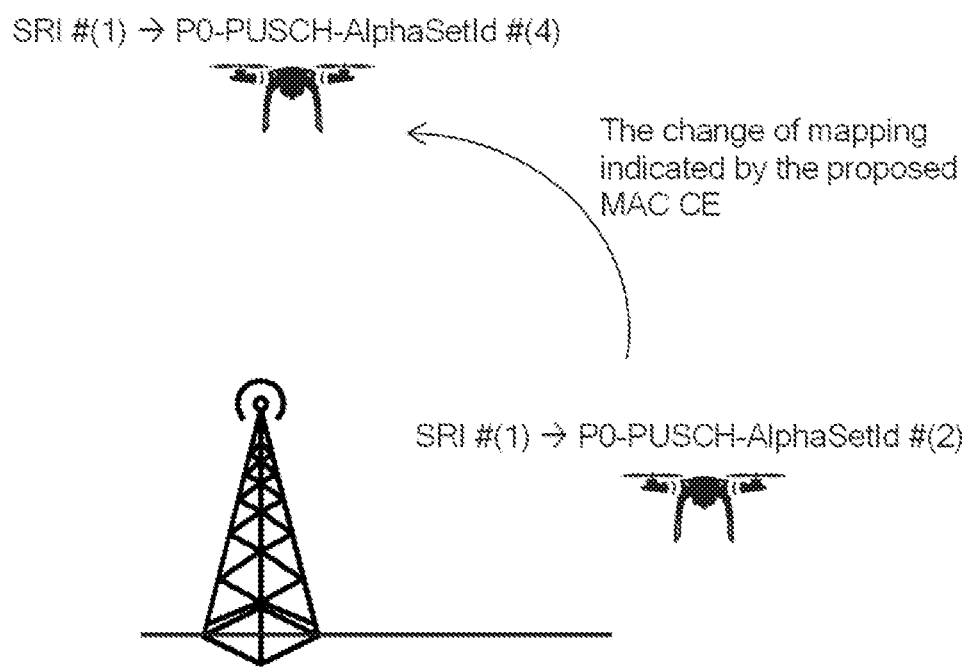
FIG. 13 illustrates an example of updated OLPC parameter mapping, in accordance with certain aspects of the present disclosure.

FIG. 13 illustrates an example of how a MAC CE may be used to update a mapping of an SRI and p0-PUSCHAlphaSetId. As illustrated, a UAV may initially be configured with a mapping of SRI ID #1 to p0-PUSCH-alphaSetID #2 (e.g., when the UAV is not flying and/or is at a relatively low altitude). An updated mapping may then be indicated via a MAC CE, as shown mapping of SRI ID #1 to p0-PUSCH-alphaSetID #4. Thus, when a PUSCH is subsequently scheduled with a DCI having a SRI ID #1, the UE will apply the new mapping and choose the ($P_0$, $\alpha$) pair associated with p0-PUSCH-alphaSetID #4.

Aspects of the present disclosure may also provide flexibility in the case that a PUSCH transmission is scheduled by a DCI format that does not include an SRI field, or if the UE is not provided a SRI-PUSCH-PowerControl by RRC. In such cases, a DCI may indicate a ($P_0$, $\alpha$) pair to use.

Figure 14:
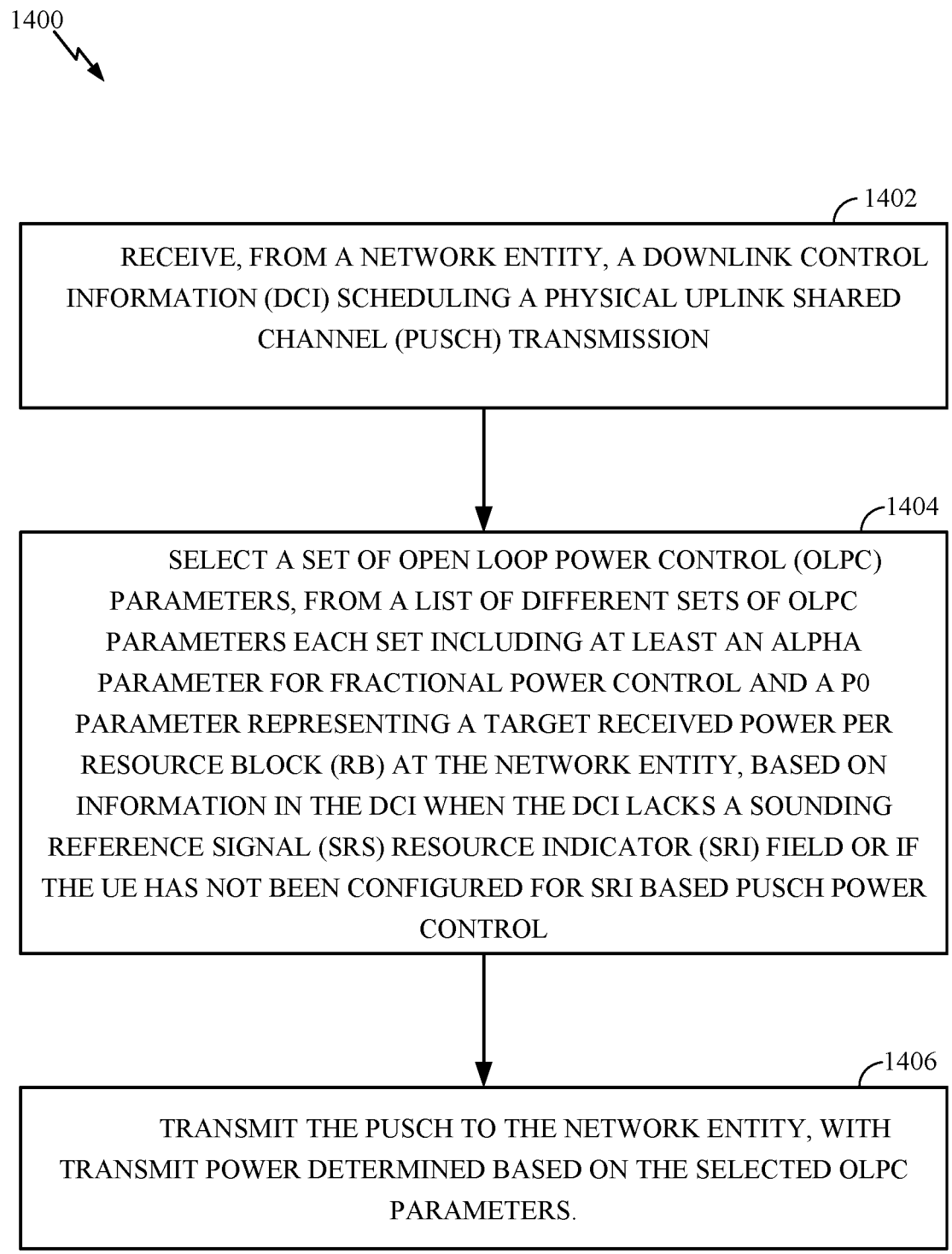
FIG. 14 illustrates example operations for wireless communication by a UE, in accordance with certain aspects of the present disclosure.

FIG. 14 is a flow diagram illustrating example operations 1400 for wireless communication by a UE, in accordance with certain aspects of the present disclosure. The operations 1400 may be performed, for example, by the UE 120a in the wireless communication network 100. The operations 1400 may be implemented as software components that are executed and run on one or more processors (e.g., the controller/processor 280 of FIG. 2). Further, the transmission and reception of signals by the UE in operations 1400 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1400 begin, at 1402, by receiving, from the network entity, a downlink control information (DCI) scheduling a physical uplink shared channel (PUSCH) transmission. At 1404, the UE selects a set of open loop power control (OLPC) parameters, from a list of different sets of OLPC parameters each set including at least an alpha parameter for fractional power control and a P0 parameter representing a target received power per resource block (RB) at the network entity, based on information in the DCI when the DCI lacks a sounding reference signal (SRS) resource indicator (SRI) field or if the UE has not been configured for SRI based PUSCH power control. At 1406, the UE transmits the PUSCH to the network entity, with transmit power determined based on the selected OLPC parameters.

FIG. 15 is a flow diagram illustrating example operations 1500 that may be considered complementary to operations 1400 of FIG. 14. For example, the operations 600 may be performed by a network entity (e.g., such as the BS 110a in the wireless communication network 100). The operations 1500 may be implemented as software components that are executed and run on one or more processors (e.g., the controller/processor 240 of FIG. 2). Further, the transmission and reception of signals by the BS in operations 600 may be enabled, for example, by one or more antennas (e.g., the antennas 234 of FIG. 2). In certain aspects, the transmission and/or reception of signals by the BS may be implemented via a bus interface of one or more processors (e.g., the controller/processor 240) obtaining and/or outputting signals.

The operations 1500 begin, at 1502, by transmitting, to a user equipment (UE), a downlink control information (DCI) scheduling a physical uplink shared channel (PUSCH) transmission, wherein the DCI indicates a set of open loop power control (OLPC) parameters, from a list of different sets of OLPC parameters each set including at least an alpha parameter for fractional power control and a P0 parameter representing a target received power per resource block (RB) at the network entity, when the DCI lacks a sounding reference signal (SRS) resource indicator (SRI) field or if the UE has not been configured for SRI based PUSCH power control. At 1504, the UE receives the PUSCH from the UE.

Figure 16:
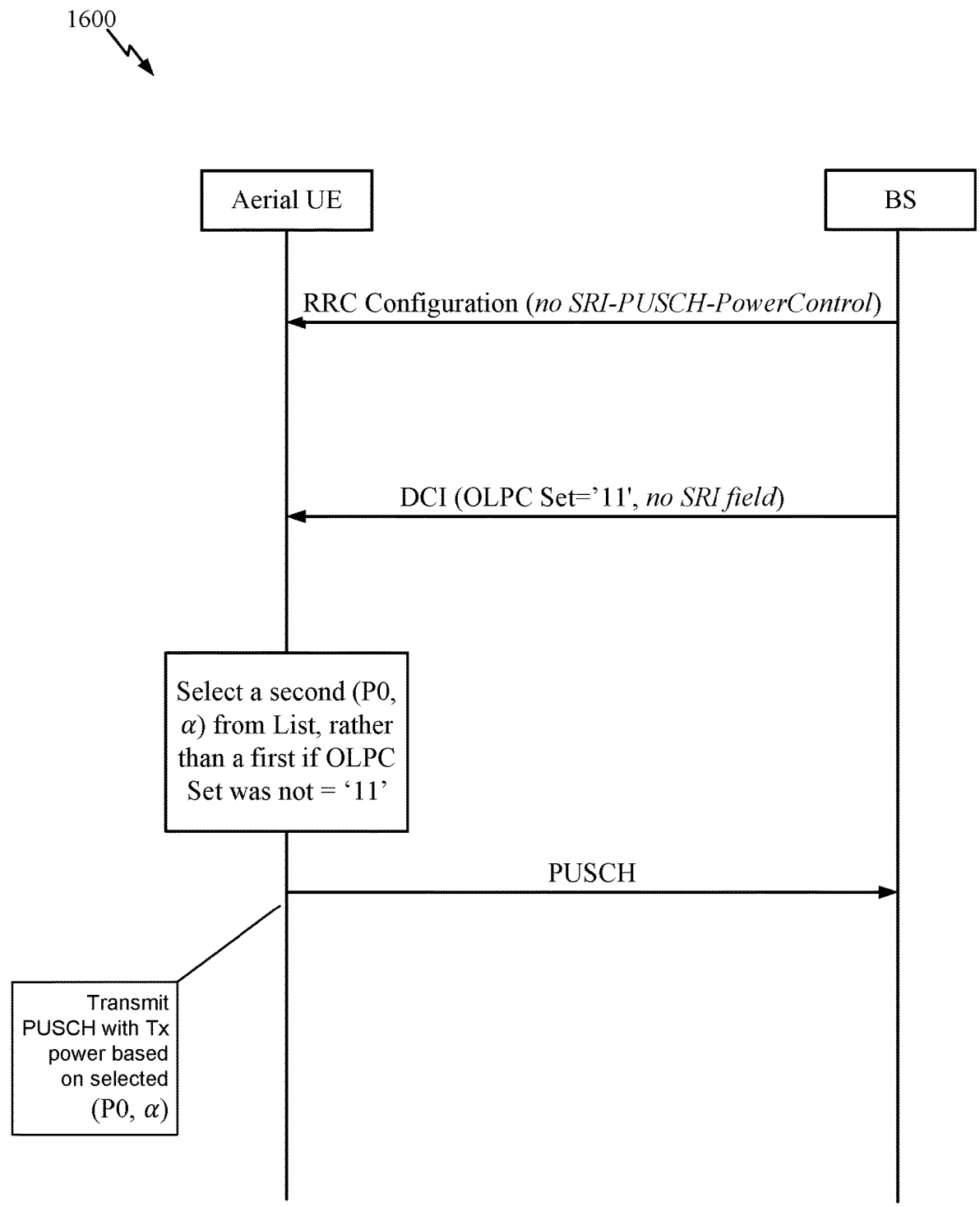
FIG. 16 is a call flow diagram illustrating uplink transmission power control, in accordance with certain aspects of the present disclosure.

Operations 1400 and 1500 of FIGS. 14 and 15 may be understood with reference to the call flow diagram of FIG. 16 which illustrates flexible power control via a DCI. As illustrated, in this case, the RRC configuration may not provide SRI based PUSCH power control and/or the PUSCH transmission may be scheduled with a DCI that lacks an SRI field.

Such a DCI may still indicate different $\{P_0, \alpha\}$ values for AUEs. For example, the DCI format may include an open-loop power control parameter set indication field that, if set to a first value (or one of a set of values), the UE may select a first P0-PUSCH-AlphaSet in p0-AlphaSets, where p0-AlphaSets is a collection of different P0-PUSCH-AlphaSet-s (and each P0-PUSCH-AlphaSet=(P0-PUSCH-AlphaSetId, P0, alpha). On the other hand, if the open-loop power control parameter set indication field is set to a reserved value (e.g., '11'), the UE may choose a second P0-PUSCH-AlphaSet in p0-AlphaSets.

Example Wireless Communication Devices

Figure 17:
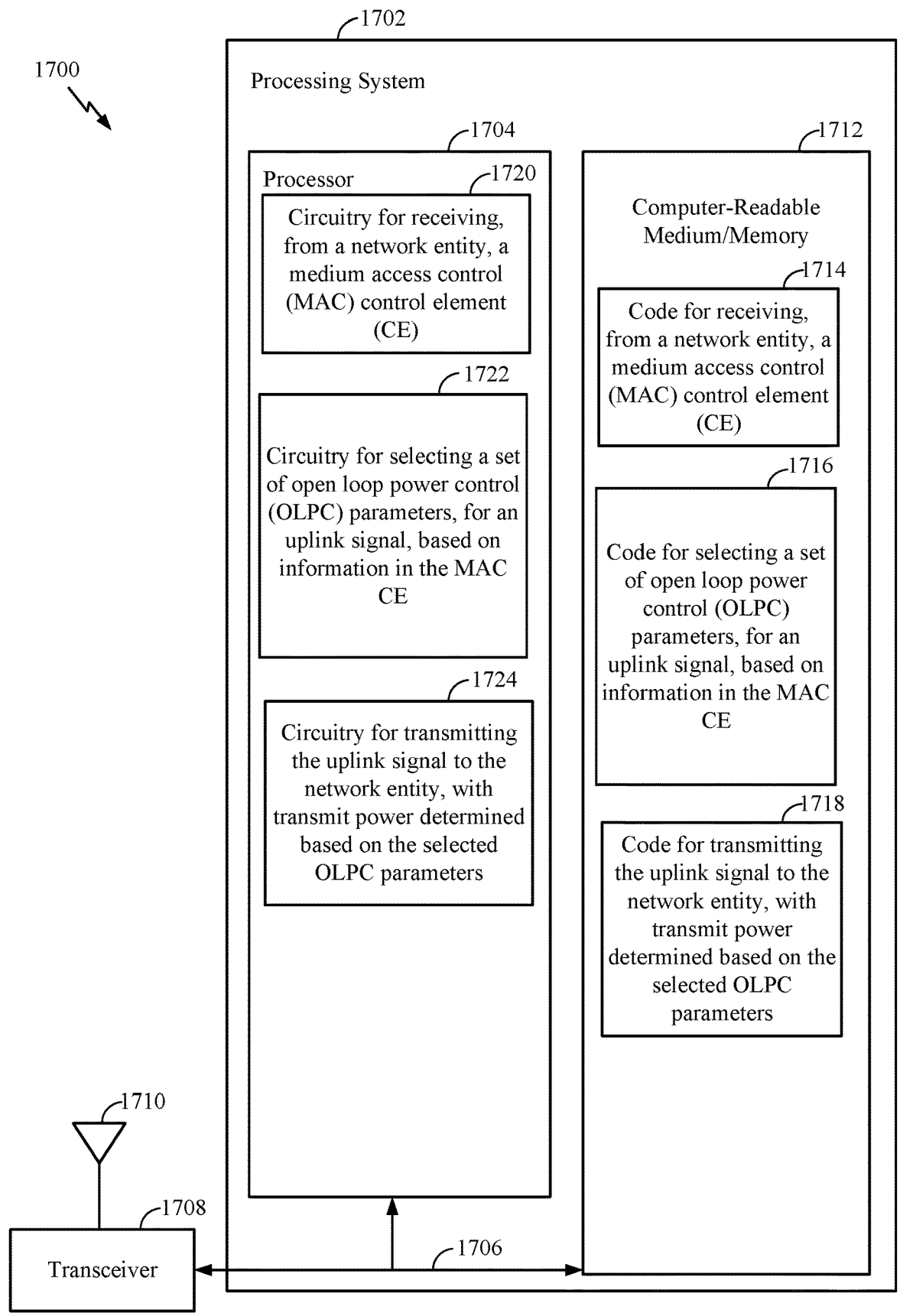
FIGS. 17-20 illustrate communication devices that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 5. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 is configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., a computer-executable code) that when executed by the processor 1704, cause the processor 1704 to perform the operations illustrated in FIG. 5, or other operations for performing the various techniques discussed herein. In certain aspects, computer-readable medium/memory 1712 stores code 1714 for receiving, from a network entity, a medium access control (MAC) control element (CE); 1716 for selecting a set of open loop power control (OLPC) parameters for an uplink signal based on information in the MAC CE; and 1718 for transmitting the uplink signal to the network entity, with transmit power determined based on the selected OLPC parameters.

The processor 1704 may include circuitry configured to implement the code stored in the computer-readable medium/memory 1712, such as for performing the operations illustrated in FIG. 5, as well as other operations for performing the various techniques discussed herein. For example, the processor 1704 includes circuitry 1720 for receiving, from a network entity, a medium access control (MAC) control element (CE); 1722 for selecting a set of open loop power control (OLPC) parameters for an uplink signal based on information in the MAC CE; and 1724 for transmitting the uplink signal to the network entity, with transmit power determined based on the selected OLPC parameters.

Figure 18:
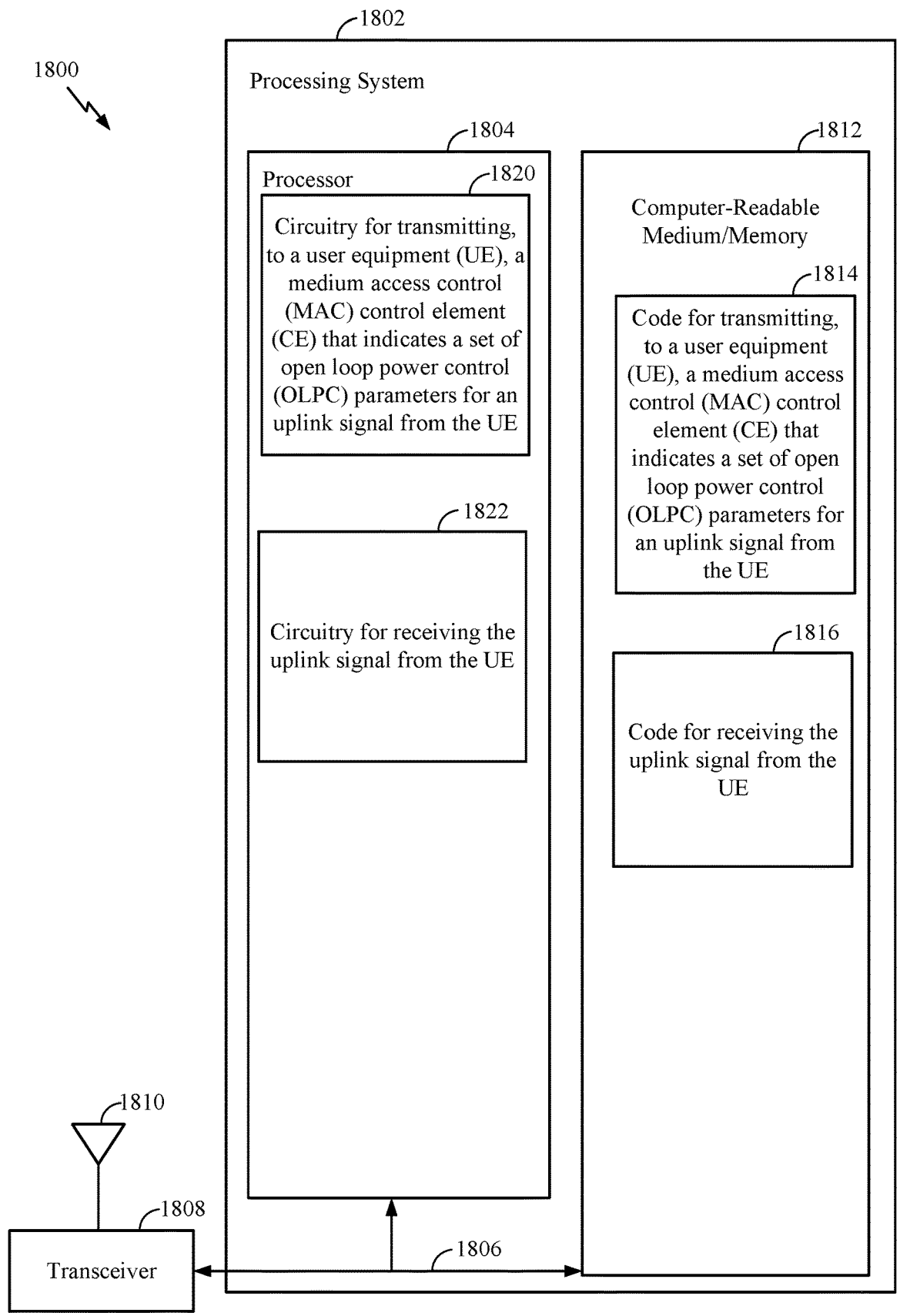

FIG. 18 illustrates a communications device 1800 that may include various components (e.g., corresponding to means-plus-function components) configured to perform operations for the techniques disclosed herein, such as the operations illustrated in FIG. 6. The communications device 1800 includes a processing system 1802 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 is configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., a computer-executable code) that when executed by the processor 1804, cause the processor 1804 to perform the operations illustrated in FIG. 6, or other operations for performing the various techniques discussed herein. In certain aspects, computer-readable medium/memory 1812 stores code 1814 for transmitting, to a user equipment (UE), a medium access control (MAC) control element (CE) that indicates a set of open loop power control (OLPC) parameters for an uplink signal from the UE; and 1816 for receiving the uplink signal from the UE.

The processor 1804 may include circuitry configured to implement the code stored in the computer-readable medium/memory 1812, such as for performing the operations illustrated in FIG. 6, as well as other operations for performing the various techniques discussed herein. For example, the processor 1804 includes circuitry 1820 for transmitting, to a user equipment (UE), a medium access control (MAC) control element (CE) that indicates a set of open loop power control (OLPC) parameters for an uplink signal from the UE; and 1822 for receiving the uplink signal from the UE.

Figure 19:
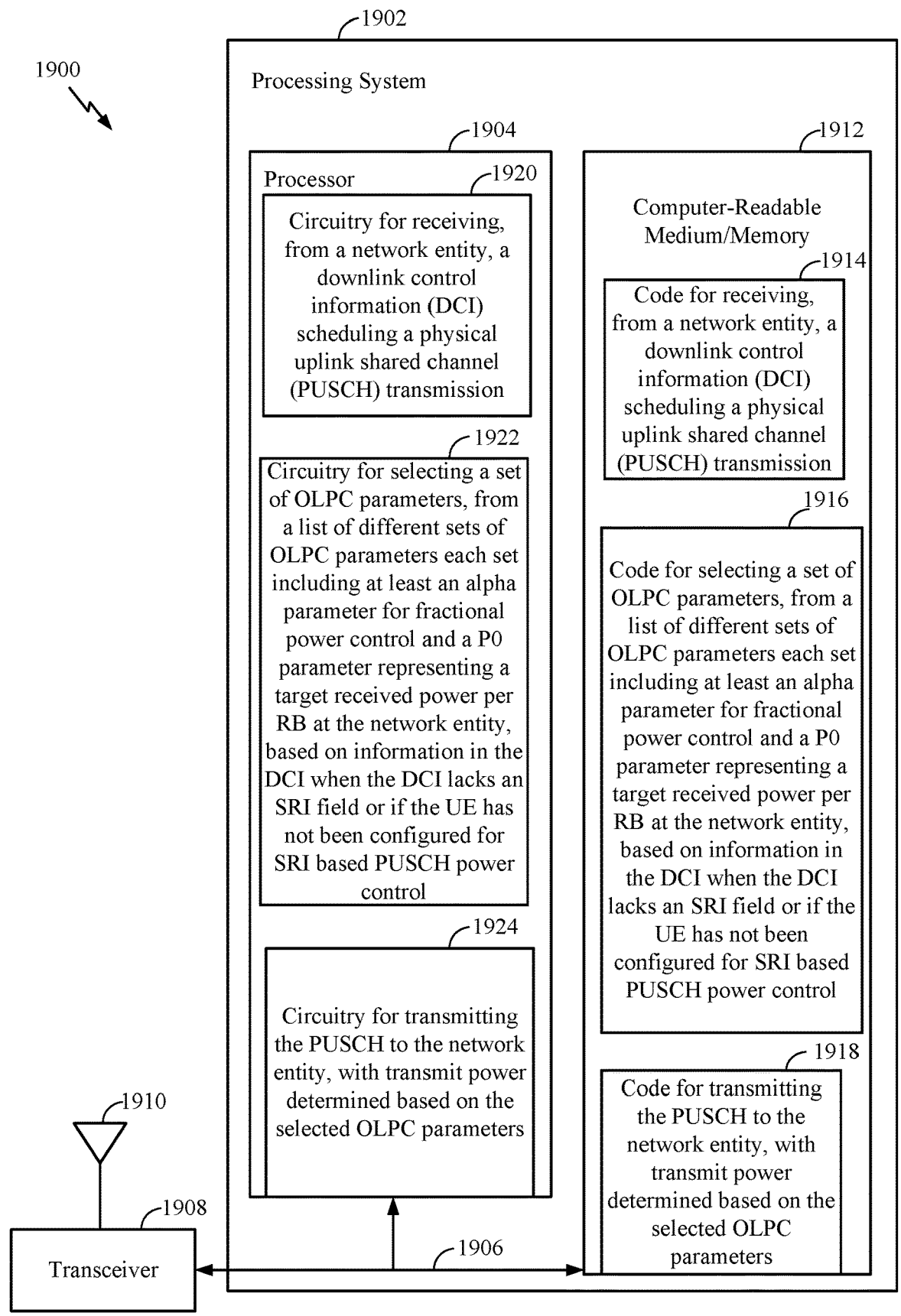

FIG. 19 illustrates a communications device 1900 that may include various components (e.g., corresponding to means-plus-function components) configured to perform operations for the techniques disclosed herein, such as the operations illustrated in FIG. 14. The communications device 1900 includes a processing system 1902 coupled to a transceiver 1908 (e.g., a transmitter and/or a receiver). The transceiver 1908 is configured to transmit and receive signals for the communications device 1900 via an antenna 1910, such as the various signals as described herein. The processing system 1902 is configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/memory 1912 is configured to store instructions (e.g., a computer-executable code) that when executed by the processor 1904, cause the processor 1904 to perform the operations illustrated in FIG. 14, or other operations for performing the various techniques discussed herein. In certain aspects, computer-readable medium/memory 1912 stores code 1914 receiving, from the network entity, a downlink control information (DCI) scheduling a physical uplink shared channel (PUSCH) transmission; 1916 for selecting a set of open loop power control (OLPC) parameters, from a list of different sets of OLPC parameters each set including at least an alpha parameter for fractional power control and a P0 parameter representing a target received power per resource block (RB) at the network entity, based on information in the DCI when the DCI lacks a sounding reference signal (SRS) resource indicator (SRI) field or if the UE has not been configured for SRI based PUSCH power control; and 1918 for transmitting the PUSCH to the network entity, with transmit power determined based on the selected OLPC parameters.

The processor 1904 may include circuitry configured to implement the code stored in the computer-readable medium/memory 1912, such as for performing the operations illustrated in FIG. 14, as well as other operations for performing the various techniques discussed herein. For example, the processor 1904 includes circuitry 1920 for receiving, from the network entity, a downlink control information (DCI) scheduling a physical uplink shared channel (PUSCH) transmission; 1922 for selecting a set of open loop power control (OLPC) parameters, from a list of different sets of OLPC parameters each set including at least an alpha parameter for fractional power control and a P0 parameter representing a target received power per resource block (RB) at the network entity, based on information in the DCI when the DCI lacks a sounding reference signal (SRS) resource indicator (SRI) field or if the UE has not been configured for SRI based PUSCH power control; and 1924 for transmitting the PUSCH to the network entity, with transmit power determined based on the selected OLPC parameters.

Figure 20:
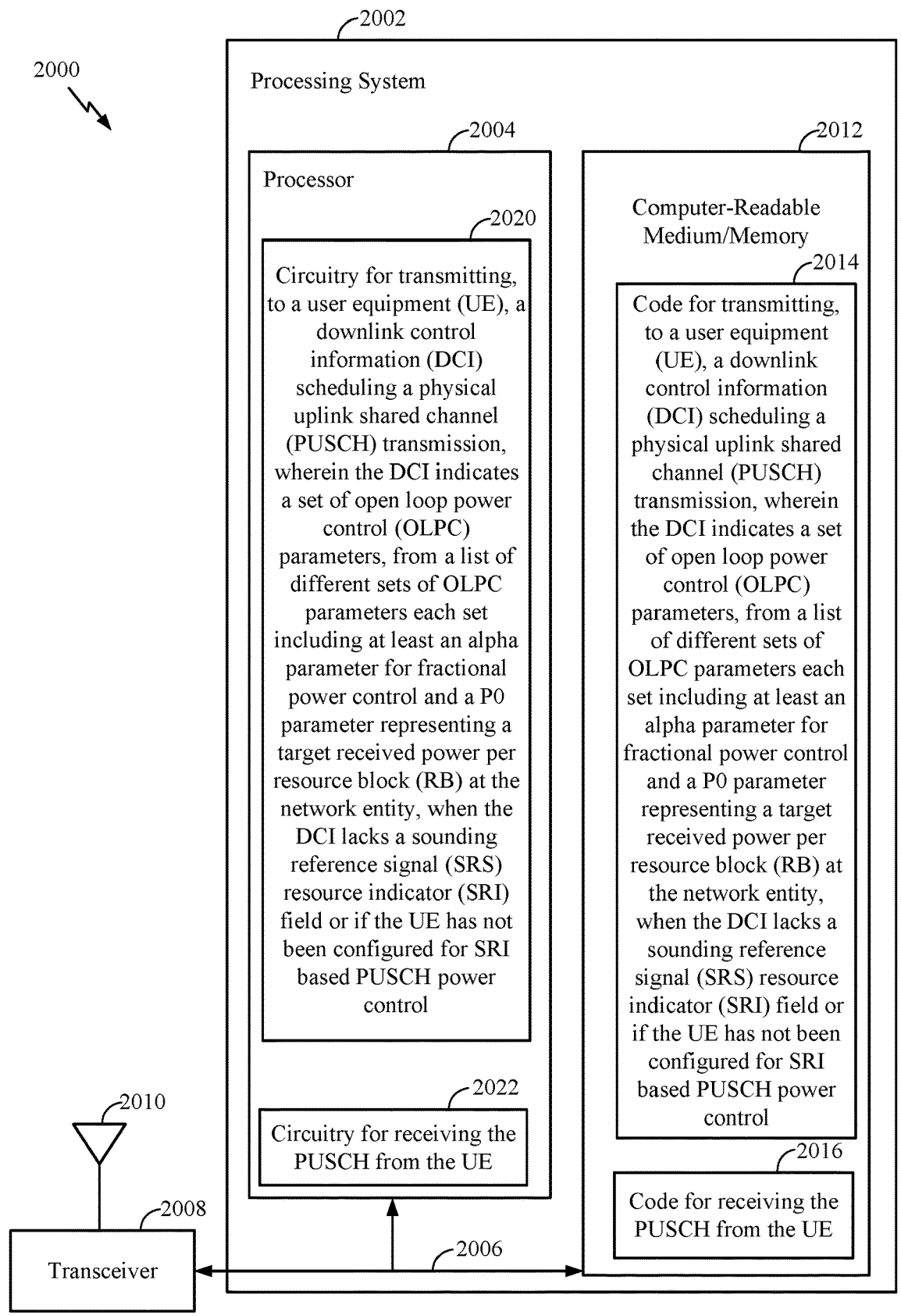

FIG. 20 illustrates a communications device 2000 that may include various components (e.g., corresponding to means-plus-function components) configured to perform operations for the techniques disclosed herein, such as the operations illustrated in FIG. 15. The communications device 2000 includes a processing system 2002 coupled to a transceiver 2008 (e.g., a transmitter and/or a receiver). The transceiver 2008 is configured to transmit and receive signals for the communications device 2000 via an antenna 2010, such as the various signals as described herein. The processing system 2002 is configured to perform processing functions for the communications device 2000, including processing signals received and/or to be transmitted by the communications device 2000.

The processing system 2002 includes a processor 2004 coupled to a computer-readable medium/memory 2012 via a bus 2006. In certain aspects, the computer-readable medium/memory 2012 is configured to store instructions (e.g., a computer-executable code) that when executed by the processor 2004, cause the processor 2004 to perform the operations illustrated in FIG. 15, or other operations for performing the various techniques discussed herein. In certain aspects, computer-readable medium/memory 2012 stores code 2014 for transmitting, to a user equipment (UE), a downlink control information (DCI) scheduling a physical uplink shared channel (PUSCH) transmission, wherein the DCI indicates a set of open loop power control (OLPC) parameters, from a list of different sets of OLPC parameters each set including at least an alpha parameter for fractional power control and a P0 parameter representing a target received power per resource block (RB) at the network entity, when the DCI lacks a sounding reference signal (SRS) resource indicator (SRI) field or if the UE has not been configured for SRI based PUSCH power control; and for 2016 receiving the PUSCH from the UE.

The processor 2004 may include circuitry configured to implement the code stored in the computer-readable medium/memory 2012, such as for performing the operations illustrated in FIG. 15, as well as other operations for performing the various techniques discussed herein. For example, the processor 2004 includes circuitry 2020 for transmitting, to a user equipment (UE), a downlink control information (DCI) scheduling a physical uplink shared channel (PUSCH) transmission, wherein information in the DCI indicates a set of open loop power control (OLPC) parameters for the UE for the PUSCH transmission when the DCI lacks a sounding reference signal (SRS) resource indicator (SRI) field or if the UE has not been configured for SRI based PUSCH power control; and 2022 for receiving the PUSCH from the UE.

Example Aspects

Aspect 1: A method for wireless communications by a user equipment (UE), comprising: receiving, from a network entity, a medium access control (MAC) control element (CE); selecting a set of open loop power control (OLPC) parameters, for an uplink signal, based on information in the MAC CE; and transmitting the uplink signal to the network entity, with transmit power determined based on the selected OLPC parameters.

Aspect 2: The method of Aspect 1, wherein the uplink signal comprises at least one of: uplink control information, a reference signal, or data.

Aspect 3: The method of any one of Aspects 1-2, wherein the UE comprises an aerial UE in flying mode.

Aspect 4: The method of any one of Aspects 1-3, wherein the set of OLPC parameters includes at least an alpha parameter for fractional power control and a P0 parameter representing a target received power per resource block (RB) at the network entity.

Aspect 5: The method of Aspect 4, further comprising receiving radio resource control (RRC) signaling configuring the UE with: at least one list of pairs of alpha and P0 parameters associated with at least one sounding reference signal (SRS) resource set; and information for mapping from SRS resource indicator (SRI) values to particular pairs of alpha and P0 parameters in the at least one list.

Aspect 6: The method of Aspect 5, wherein: the MAC CE activates one pair of alpha and P0 parameters from the at least one list; and the uplink signal comprises a sounding reference signal (SRS) with transmission power determined according to the activated pair of alpha and P0 parameters.

Aspect 7: The method of Aspect 4, further comprising receiving radio resource control (RRC) signaling configuring the UE with: at least one list of pairs of alpha and P0 parameters associated with PUSCH transmission; at least one sounding reference signal (SRS) resource set; and information for mapping from SRS resource indicator (SRI) values to particular pairs of alpha and P0 parameters in the at least one list.

Aspect 8: The method of Aspect 7, wherein: the uplink signal comprises a physical uplink shared channel (PUSCH) scheduled by a downlink control information (DCI); the DCI includes an SRI value; and the MAC CE updates the mapping from the SRI values to particular pairs of alpha and P0 parameters in the at least one list.

Aspect 9: A method for wireless communications by a user equipment (UE), comprising: receiving, from a network entity, a downlink control information (DCI) scheduling a physical uplink shared channel (PUSCH) transmission; selecting a set of open loop power control (OLPC) parameters, from a list of different sets of OLPC parameters each set including at least an alpha parameter for fractional power control and a P0 parameter representing a target received power per resource block (RB) at the network entity, based on information in the DCI when the DCI lacks a sounding reference signal (SRS) resource indicator (SRI) field or if the UE has not been configured for SRI based PUSCH power control; and transmitting the PUSCH to the network entity, with transmit power determined based on the selected OLPC parameters.

Aspect 10: The method of Aspect 9, wherein the UE comprises an aerial UE in flying mode.

Aspect 11: The method of any one of Aspects 9-10, wherein the UE selects the set of OLPC parameters from the list of different sets of OLPC parameters if the DCI includes an OLPC set indicator field with a reserved value.

Aspect 12: The method of Aspect 11, wherein the UE is configured to: select a first set of OLPC parameters if the OLPC set indicator field is a value other than the reserved value; and select a second set of OLPC parameters if the OLPC set indicator field is the reserved value.

Aspect 13: A method for wireless communications by a network entity, comprising: transmitting, to a user equipment (UE), a medium access control (MAC) control element (CE) that indicates a set of open loop power control (OLPC) parameters for an uplink signal from the UE; and receiving the uplink signal from the UE.

Aspect 14: The method of Aspect 13, wherein the uplink signal comprises at least one of: uplink control information, a reference signal, or data.

Aspect 15: The method of any one of Aspects 13-14, further comprising: detecting that the UE is an aerial UE in flying mode or above a height threshold; and transmitting the MAC CE to update OLPC parameters used by the UE for the uplink signal transmission based on the detection.

Aspect 16: The method of any one of Aspects 13-15, wherein the set of OLPC parameters includes at least an alpha parameter for fractional power control and a P0 parameter representing a target received power per resource block (RB) at the network entity.

Aspect 17: The method of Aspect 16, further comprising transmitting radio resource control (RRC) signaling configuring the UE with: at least one list of pairs of alpha and P0 parameters associated with at least one sounding reference signal (SRS) resource set; and information for mapping from SRS resource indicator (SRI) values to particular pairs of alpha and P0 parameters in the at least one list.

Aspect 18: The method of Aspect 17, wherein: the MAC CE activates one pair of alpha and P0 parameters from the at least one list; and the uplink signal comprises a sounding reference signal (SRS) with transmission power determined according to the activated pair of alpha and P0 parameters.

Aspect 19: The method of Aspect 16, further comprising transmitting radio resource control (RRC) signaling configuring the UE with: at least one list of pairs of alpha and P0 parameters associated with PUSCH transmission; at least one sounding reference signal (SRS) resource set; and information for mapping from SRS resource indicator (SRI) values to particular pairs of alpha and P0 parameters in the at least one list.

Aspect 20: The method of Aspect 19, wherein: the uplink signal comprises a physical uplink shared channel (PUSCH) scheduled by a downlink control information (DCI); the DCI includes an SRI value; and the MAC CE updates the mapping from the SRI values to particular pairs of alpha and P0 parameters in the at least one list.

Aspect 21: A method for wireless communications by a network entity, comprising: transmitting, to a user equipment (UE), a downlink control information (DCI) scheduling a physical uplink shared channel (PUSCH) transmission, wherein the DCI indicates a set of open loop power control (OLPC) parameters, from a list of different sets of OLPC parameters each set including at least an alpha parameter for fractional power control and a P0 parameter representing a target received power per resource block (RB) at the network entity, when the DCI lacks a sounding reference signal (SRS) resource indicator (SRI) field or if the UE has not been configured for SRI based PUSCH power control; and receiving the PUSCH to the network entity.

Aspect 22: The method of Aspect 21, further comprising: detecting that the UE is an aerial UE in flying mode or above a height threshold; and setting the information in the DCI to indicate the set of OLPC parameters based on the detection.

Aspect 23: The method of any one of Aspects 21-22, wherein the network entity sets an OLPC set indicator field to a reserved value to indicate the set of OLPC parameters from the list of different sets of OLPC parameters.

Aspect 24: The method of Aspect 23, wherein the network entity: sets the OLPC set indicator field to a value other than the reserved value to indicate a first set of OLPC parameters; and sets the OLPC set indicator field to the reserved value to indicate a second set of OLPC parameters.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, allocating, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5, 6, 14, and 15.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
   receiving, from a network entity, a medium access control (MAC) control element (CE);
   selecting a set of open loop power control (OLPC) parameters, for an uplink signal, based on information in the MAC CE, wherein the set of OLPC parameters includes at least an alpha parameter for fractional power control and a P0 parameter representing a target received power per resource block (RB) at the network entity; and
   transmitting the uplink signal to the network entity, with transmit power determined based on the selected OLPC parameters.

2. The method of claim 1, wherein the uplink signal comprises at least one of: uplink control information, a reference signal, or data.

3. The method of claim 1, wherein the UE comprises an aerial UE in flying mode.

4. The method of claim 1, further comprising receiving radio resource control (RRC) signaling configuring the UE with:
   at least one list of pairs of alpha and P0 parameters associated with at least one sounding reference signal (SRS) resource set; and
   information for mapping from SRS resource indicator (SRI) values to particular pairs of alpha and P0 parameters in the at least one list.

5. The method of claim 4, wherein:
   the MAC CE activates one pair of alpha and P0 parameters from the at least one list; and
   the uplink signal comprises a SRS with a transmission power determined according to the activated pair of alpha and P0 parameters.

6. The method of claim 1, further comprising receiving radio resource control (RRC) signaling configuring the UE with:
   at least one list of pairs of alpha and P0 parameters associated with PUSCH transmission;
   at least one SRS resource set; and
   information for mapping from SRI values to particular pairs of alpha and P0 parameters in the at least one list.

7. The method of claim 6, wherein:
   the uplink signal comprises a physical uplink shared channel (PUSCH) scheduled by a downlink control information (DCI);
   the DCI includes an SRI value; and
   the MAC CE updates the mapping from the SRI values to particular pairs of alpha and P0 parameters in the at least one list.

8. A method for wireless communications by a user equipment (UE), comprising:
   receiving, from a network entity, a downlink control information (DCI) scheduling a physical uplink shared channel (PUSCH) transmission;
   selecting, when the DCI lacks a sounding reference signal (SRS) resource indicator (SRI) field or when the UE has not been configured for SRI based PUSCH power control, a set of open loop power control (OLPC) parameters from a list of different sets of OLPC parameters based on information in the DCI, wherein each set of OLPC parameters include at least an alpha parameter for fractional power control and a P0 parameter representing a target received power per resource block (RB) at the network entity; and
   transmitting the PUSCH to the network entity, with transmit power determined based on the selected OLPC parameters.

9. The method of claim 8, wherein the UE comprises an aerial UE in flying mode.

10. The method of claim 8, wherein the UE selects the set of OLPC parameters from the list of different sets of OLPC parameters if the DCI includes an OLPC set indicator field with a reserved value.

11. The method of claim 10, wherein the UE is configured to:
select a first set of OLPC parameters if the OLPC set indicator field is a value other than the reserved value; and
select a second set of OLPC parameters if the OLPC set indicator field is the reserved value.

12. A method for wireless communications by a network entity, comprising:
transmitting, to a user equipment (UE), a medium access control (MAC) control element (CE) that indicates a set of open loop power control (OLPC) parameters for an uplink signal from the UE, wherein the set of OLPC parameters includes at least an alpha parameter for fractional power control and a P0 parameter representing a target received power per resource block (RB) at the network entity; and
receiving the uplink signal from the UE.

13. The method of claim 12, wherein the uplink signal comprises at least one of: uplink control information, a reference signal, or data.

14. The method of claim 12, further comprising:
detecting that the UE is an aerial UE in flying mode or above a height threshold; and
transmitting the MAC CE to update OLPC parameters used by the UE for the uplink signal transmission based on the detection.

15. The method of claim 12, further comprising transmitting radio resource control (RRC) signaling configuring the UE with:
at least one list of pairs of alpha and P0 parameters associated with at least one sounding reference signal (SRS) resource set; and
information for mapping from SRS resource indicator (SRI) values to particular pairs of alpha and P0 parameters in the at least one list.

16. The method of claim 15, wherein:
the MAC CE activates one pair of alpha and P0 parameters from the at least one list; and
the uplink signal comprises a SRS with a transmission power determined according to the activated pair of alpha and P0 parameters.

17. The method of claim 12, further comprising transmitting radio resource control (RRC) signaling configuring the UE with:
at least one list of pairs of alpha and P0 parameters associated with PUSCH transmission;
at least one SRS resource set; and
information for mapping from SRS SRI values to particular pairs of alpha and P0 parameters in the at least one list.

18. The method of claim 17, wherein:
the uplink signal comprises a physical uplink shared channel (PUSCH) scheduled by a downlink control information (DCI);
the DCI includes an SRI value; and
the MAC CE updates the mapping from the SRI values to particular pairs of alpha and P0 parameters in the at least one list.

19. A method for wireless communications by a network entity, comprising:
transmitting, to a user equipment (UE), a downlink control information (DCI) scheduling a physical uplink shared channel (PUSCH) transmission, wherein:
the DCI indicates a set of open loop power control (OLPC) parameters, from a list of different sets of OLPC parameters, when the DCI lacks a sounding reference signal (SRS) resource indicator (SRI) field or when the UE has not been configured for SRI based PUSCH power control, and
each set of OLPC parameters includes at least an alpha parameter for fractional power control and a P0 parameter representing a target received power per resource block (RB) at the network entity; and
receiving the PUSCH to the network entity.

20. The method of claim 19, further comprising:
detecting that the UE is an aerial UE in flying mode or above a height threshold; and
setting the information in the DCI to indicate the set of OLPC parameters based on the detection.

21. The method of claim 19, wherein the network entity sets an OLPC set indicator field to a reserved value to indicate the set of OLPC parameters from the list of different sets of OLPC parameters.

22. The method of claim 21, wherein the network entity:
sets the OLPC set indicator field to a value other than the reserved value to indicate a first set of OLPC parameters; and
sets the OLPC set indicator field to the reserved value to indicate a second set of OLPC parameters.

\* \* \* \* \*